(12) United States Patent
Nakamura et al.

(10) Patent No.: US 10,663,709 B2
(45) Date of Patent: May 26, 2020

(54) OPTICAL DEVICE FOR MICROSCOPIC OBSERVATION

(71) Applicant: HAMAMATSU PHOTONICS K.K., Hamamatsu-shi, Shizuoka (JP)

(72) Inventors: Tomonori Nakamura, Hamamatsu (JP); Ikuo Arata, Hamamatsu (JP); Yoshihiro Ito, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/025,288

(22) Filed: Jul. 2, 2018

(65) Prior Publication Data

US 2018/0307030 A1 Oct. 25, 2018

Related U.S. Application Data

(63) Continuation of application No. 15/198,634, filed on Jun. 30, 2016, now Pat. No. 10,048,483, which is a (Continued)

(30) Foreign Application Priority Data

Jun. 30, 2011 (JP) .................................. 2011-145488
Dec. 27, 2011 (JP) .................................. 2011-286218

(51) Int. Cl.
*G02B 21/36* (2006.01)
*G02B 21/00* (2006.01)
(Continued)

(52) U.S. Cl.
CPC ........... *G02B 21/361* (2013.01); *G02B 5/006* (2013.01); *G02B 21/0004* (2013.01);
(Continued)

(58) Field of Classification Search
CPC .......... G02B 3/12; G02B 5/005; G02B 5/006; G02B 5/08–0875; G02B 5/10;
(Continued)

(56) References Cited

U.S. PATENT DOCUMENTS 4,783,593 A * 11/1988 Noble ..................... G01J 5/061
250/332
4,820,923 A 4/1989 Wellman
(Continued)

FOREIGN PATENT DOCUMENTS

CN 1534273 A 10/2004
CN 101308243 A 11/2008
(Continued)

*Primary Examiner* — Derek S. Chapel
*Assistant Examiner* — Adam W Booher
(74) *Attorney, Agent, or Firm* — Faegre Drinker Biddle & Reath LLP

(57) ABSTRACT

An optical device for microscopic observation 4 comprises: a cold stop 13 having openings 13*d*, 13*e* corresponding to a low-magnification microscope optical system 5 and being a stop member arranged in a vacuum vessel 12 to let the light from the sample S pass to the camera 3; a warm stop 10 having an opening 14 corresponding to a high-magnification microscope optical system 5 and being a stop member arranged outside the vacuum vessel 12 to let the light from the sample S pass toward the cold stop 13; and a support member 11 supporting the warm stop 10 so that the warm stop can be inserted to or removed from on the optical axis of the light from the sample S, wherein the warm stop 10 has a reflective surface 15 on the camera 3 side and wherein the opening 14 is smaller than the openings 13*d*, 13*e*.

12 Claims, 15 Drawing Sheets

Related U.S. Application Data continuation of application No. 14/124,280, filed as application No. PCT/JP2012/062668 on May 17, 2012, now Pat. No. 9,411,143.

(51) Int. Cl.
- *G02B 5/00* (2006.01)
- *G02B 27/00* (2006.01)
- *G02B 21/04* (2006.01)
- *G02B 21/16* (2006.01)
- *G02B 21/24* (2006.01)

(52) U.S. Cl.
CPC ......... *G02B 21/0016* (2013.01); *G02B 21/04* (2013.01); *G02B 21/16* (2013.01); *G02B 21/248* (2013.01); *G02B 27/0018* (2013.01)

(58) Field of Classification Search
CPC ...... G02B 21/28; G02B 21/248; G02B 13/14; G02B 26/02; G02B 26/023; G02B 27/0018; G02B 21/00–368; G01J 5/06; G01J 5/08; G03B 9/00–54
USPC ....... 359/233, 350, 355–357, 368, 381, 395, 359/868, 869; 250/352, 353, 338, 330; 350/276, 319
See application file for complete search history.

(56) References Cited

U.S. PATENT DOCUMENTS

| | | | |
|---|---|---|---|
| 6,323,995 B1 * | 11/2001 | Takahama | G02B 7/003 359/371 |
| 6,825,978 B2 * | 11/2004 | Khurana | G02B 21/0004 348/E5.09 |
| 7,136,235 B2 | 11/2006 | Kirkham | |
| 7,180,067 B2 | 2/2007 | Wolske | |
| 7,378,657 B2 | 5/2008 | Hoult et al. | |
| 7,457,052 B2 | 11/2008 | Hirata | |
| 7,729,049 B2 | 6/2010 | Xu et al. | |
| 2001/0008460 A1 | 7/2001 | Yamawaki | |
| 2004/0211907 A1 | 10/2004 | Wellman et al. | |
| 2008/0088918 A1 * | 4/2008 | O'Connell | G02B 21/365 359/371 |
| 2009/0084956 A1 * | 4/2009 | Gat | G01J 5/06 250/338.1 |
| 2010/0055842 A1 * | 3/2010 | Sugo | C08G 59/621 438/118 |
| 2011/0121199 A1 * | 5/2011 | Tanikawa | G01J 3/02 250/458.1 |

FOREIGN PATENT DOCUMENTS

| | | |
|---|---|---|
| CN | 101515056 A | 8/2009 |
| JP | H02-88929 A | 3/1990 |
| JP | H03-41328 A | 2/1991 |
| JP | H05-312638 A | 11/1993 |
| JP | H06-160696 A | 6/1994 |
| JP | H08-191150 A | 7/1996 |
| JP | 2005-128443 A | 5/2005 |
| JP | 2007-163738 A | 6/2007 |
| JP | 2009-109407 A | 5/2009 |
| JP | 2009-204423 A | 9/2009 |
| JP | 2013-033198 A | 2/2013 |
| KR | 100966931 B1 | 6/2010 |
| TW | 200539489 A | 12/2005 |

* cited by examiner

OPTICAL DEVICE FOR MICROSCOPIC OBSERVATION

CROSS-REFERENCE TO RELATED APPLICATIONS

This application is a Continuation Application of copending U.S. application Ser. No. 15/198,634 (allowed), filed Jun. 30, 2016, which is a Continuation Application of U.S. application Ser. No. 14/124,280, filed Dec. 6, 2013 (now U.S. Pat. No. 9,411,143, issued Aug. 9, 2016), the entire contents of which are incorporated herein by reference. U.S. patent application Ser. No. 14/124, 280 is a § 371 national stage application of International Application No. PCT/JP2012/062668, filed May 17, 2012, which claims the benefit of Japanese Patent Application No. 2011-145488, filed Jun. 30, 2011 and Japanese Patent Application No 2011-286218, filed Dec. 27, 2011. The contents of both the § 371 application and the Japanese Patent Applications are incorporated herein by reference in their entirety.

TECHNICAL FIELD

The present invention relates to an optical device for microscopic observation provided for enlarged observation of light from an object.

BACKGROUND ART

Optical devices for observing light of specific wavelength such as infrared light from an object have been used heretofore. Such optical devices are provided with a mechanism for suppressing influence of light from the part other than the object. For example, Patent Literature 1 below discloses an infrared detecting device having a toroidal warmshield comprising segments. This infrared detecting device is provided with a vacuum window in a front face of a coldshield surrounding an infrared detector, and three toroidal reflective members are arranged in front of this vacuum window. These toroidal reflective members have respective openings in their centers and these openings are arranged as aligned on a central axis so that they are located in symmetry with respect to the central axis of the detecting device. The sizes of the respective openings are set according to the diameter of an optical image to be detected by the infrared detector. Inside surfaces of these toroidal reflective members are toroidal surfaces.

Patent Literature 2 below discloses an infrared optical device for letting infrared light from an object pass through an interchangeable lens and impinge on a detector element, this infrared optical device is equipped with a Dewar vessel provided around the detector element and two mirror apertures provided outside the Dewar vessel, and these mirror apertures are arranged as movable along the optical axis of the interchangeable lens. Mirror surfaces are provided on the inside of the mirror apertures, the infrared light from the object travels through opening portions of the mirror apertures to reach the detector element in the Dewar vessel, and infrared light emanating from the part other than the object is prevented from impinging on the detector element, because only the cooled part or only the detector element is seen when the mirror surfaces are viewed from the detector element. As a result, good imaging performance can be achieved.

CITATION LIST

Patent Literature

Patent Literature 1: U.S. Pat. No. 4,820,923
Patent Literature 2: Japanese Patent Application Laid-Open Publication No. H06-160696

SUMMARY OF INVENTION

Technical Problems

In the infrared detecting device described in the foregoing Patent Literature 1, however, since the sizes of the openings of the toroidal reflective members are set according to the aperture of the coldshield, it is difficult, with a changeover of the magnification of the optical system located on the object side, to make an image according to the changed magnification impinge on the detector element.

The infrared optical device described in the foregoing Patent Literature 2 allows suitable observation of the object with use of interchangeable lenses of various numerical apertures at different magnifications by moving the mirror apertures along the optical axis of the interchangeable lens upon a change of the object-side interchangeable lens, but it requires a mechanism for adjusting the positions of the mirror apertures, which tends to increase the scale of the device. If there is a large difference between image-side numerical apertures of interchangeable lenses as interchanged objects, it is necessary to ensure a large adjustable distance for the mirror apertures, which tends to increase the scale of the device.

The present invention has been accomplished in view of the foregoing problems and it is an object of the present invention to provide an optical device for microscopic observation enabling a changeover between a plurality of observation magnifications of the object and allowing easy implementation of downsizing of the device.

Solution to Problems

In order to solve the above problems, an optical device for microscopic observation according to an aspect of the present invention is an optical device for microscopic observation which makes light from an object incident on an imaging element, the optical device comprising: a cold stop which has a first opening corresponding to an optical system on the object side having a first magnification and which is arranged in a vacuum vessel to let the light from the object pass to the imaging element; a warm stop which has a second opening corresponding to an optical system on the object side having a second magnification and which is a stop member arranged outside the vacuum vessel to let the light from the object pass toward the cold stop; and a support member which supports the warm stop so that the warm stop can be inserted to or removed from on the optical axis of the light from the object, wherein the warm stop has a reflective surface on the imaging element side and wherein the second opening is smaller than the first opening.

In this optical device for microscopic observation, when the optical system set at the first magnification is used as the object-side optical system, the warm stop is set off from on the optical axis, whereby the light from the object impinges on the imaging element while being narrowed down by the cold stop with the first opening corresponding to an NA of the optical system, which reduces background noise in a detected image by the imaging element. Furthermore, when the optical system set at the second magnification is used as the object-side optical system, the warm stop with the second opening corresponding to an NA of the optical system is arranged on the optical axis, whereby the light from the object is narrowed down according to a beam thereof and thereafter passes through the cold stop to impinge on the imaging element. Here, since the second opening is smaller than the first opening, the background noise can be reduced corresponding to optical systems with multiple magnifications even if the support member for inserting and removing the warm stop is located outside the vacuum vessel, which can simplify the structure of the support member. Since this support member is disposed in directions intersecting with the optical axis of the optical system, downsizing of the support member is also readily realized. As a result, it becomes feasible to implement a changeover between a plurality of observation magnifications, while reducing the background noise for optical systems with multiple observation magnifications, and to readily realize downsizing of the device.

Advantageous Effect of Invention

The present invention enables reduction in background noise for optical systems with multiple observation magnifications and easy implementation of downsizing of the device.

DESCRIPTION OF EMBODIMENTS

Preferred embodiments of optical devices for microscopic observation according to the present invention will be described below in detail with reference to the drawings. Identical or equivalent portions will be denoted by the same reference signs in the description of the drawings, without redundant description.

First Embodiment

Figure 1:
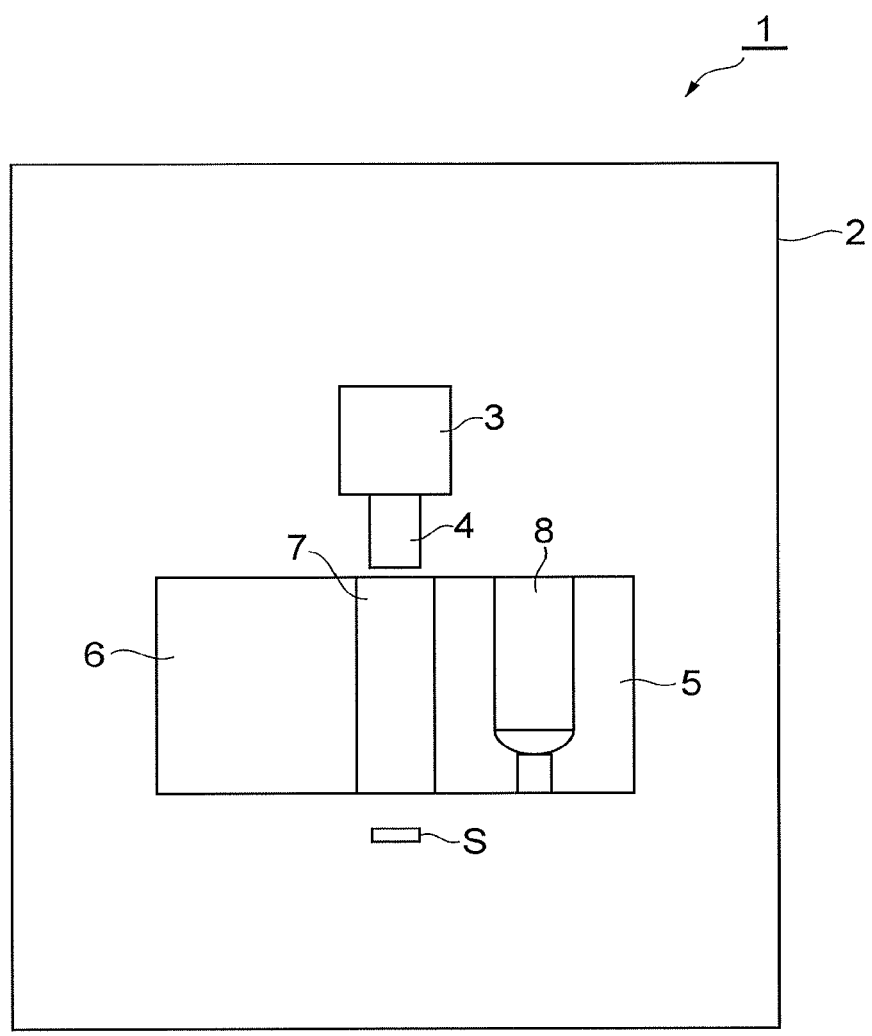
FIG. 1 is a schematic configuration diagram of a microscope device according to a preferred embodiment of the present invention.

FIG. 1 is a schematic configuration diagram of a microscope device 1 for luminescence observation according to the first embodiment of the present invention. The microscope device 1 shown in the same drawing is composed of a dark box 2, a camera (imaging element) 3 that can detect infrared light emitted from a sample (object) S set in the dark box 2, an optical device for microscopic observation 4 attached to the camera 3, and a microscope optical system 5 arranged between the camera 3 integrated with the optical device for microscopic observation 4, and the sample S. This microscope optical system 5 is an optical system for forming an infrared image of the sample S at a desired magnification in the camera 3, and is configured in a structure wherein a macro optical system 7 incorporating a lens with a relatively low magnification and a micro optical system 8 incorporating a lens with a higher magnification than the magnification of the macro optical system 7 are supported so that they can be changed over from one to the other by an optical system changeover mechanism 6. This microscope optical system 5 implements such a changeover as to locate either of the macro optical system 7 and the micro optical system 8 between the sample S and the optical device for microscopic observation 4, whereby infrared light emitted from the sample S is incident into the camera 3 through the objective optical system according to the desired magnification.

Figure 2:
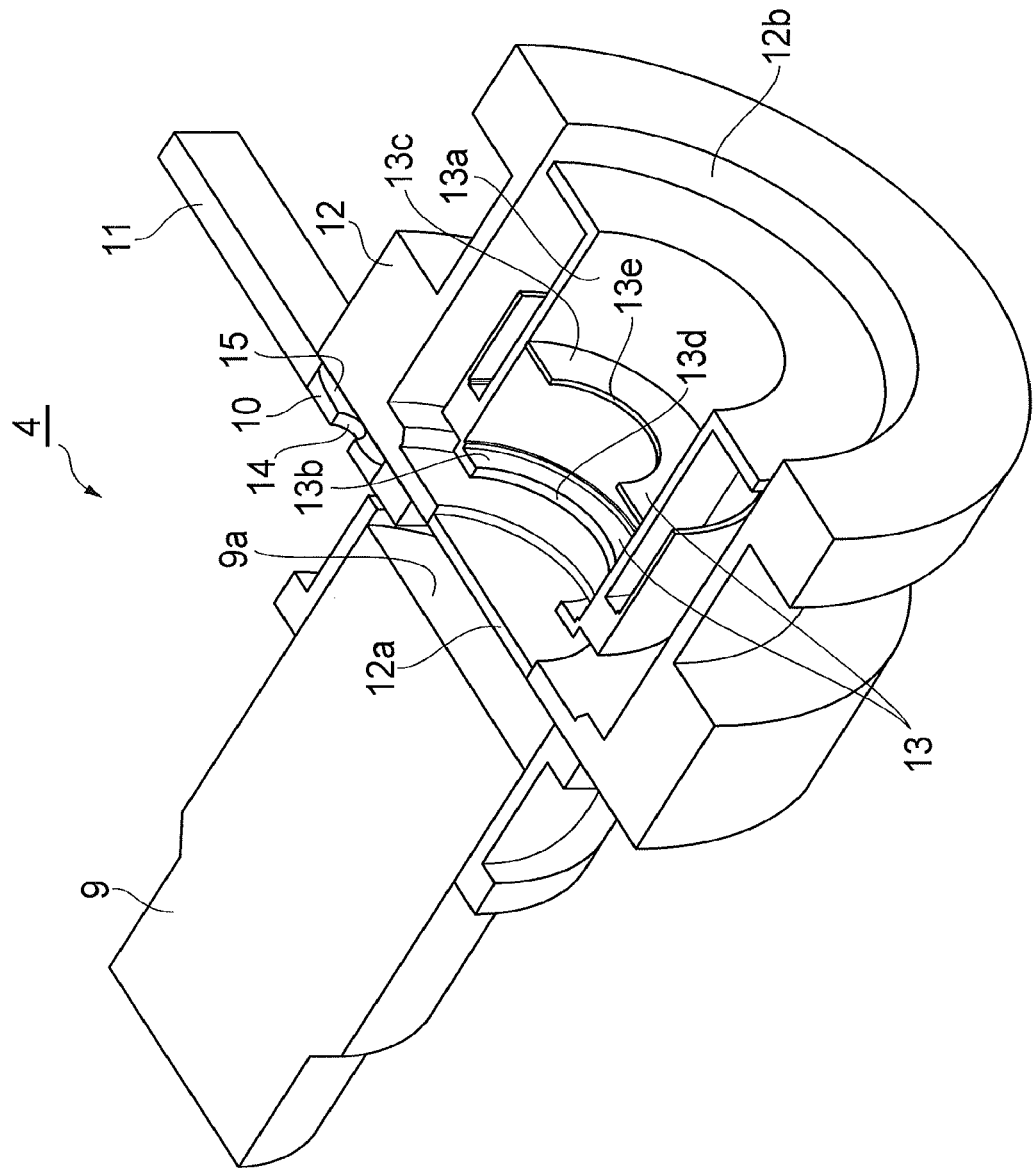
FIG. 2 is a perspective view showing an optical device for microscopic observation 4 shown in FIG. 1, which is cut along a central axis.
Figure 3:
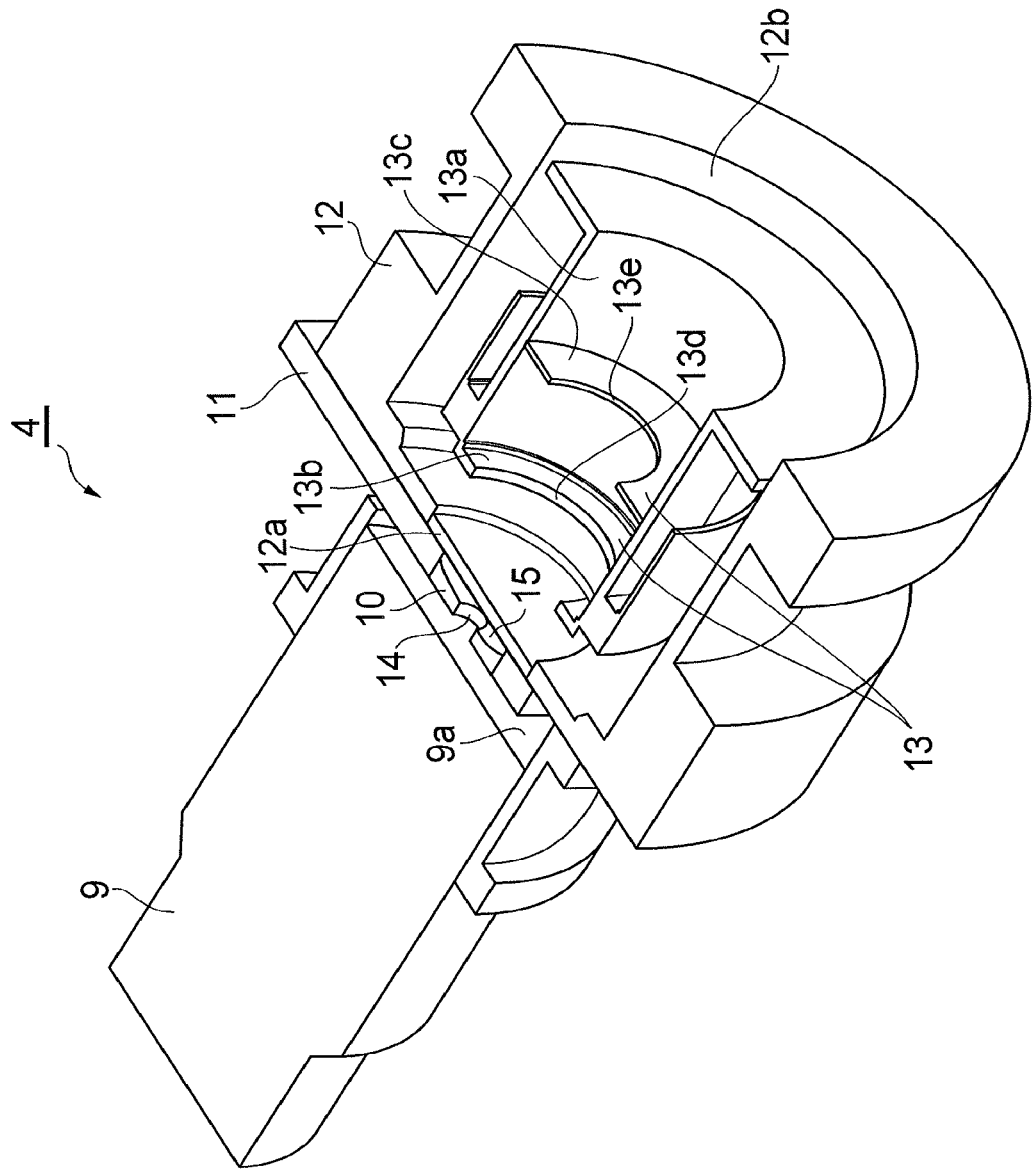
FIG. 3 is a perspective view showing the optical device for microscopic observation 4 shown in FIG. 1, which is cut along the central axis.

The optical device for microscopic observation 4 is an optical device for combining the camera 3 capable of detecting the infrared light, with the microscope optical system 5 for forming the infrared image of the sample S in the camera 3, while allowing a changeover between the magnifications. FIGS. 2 and 3 are perspective views showing the optical device for microscopic observation 4 cut along the central axis. FIG. 2 shows a use state of the optical device for microscopic observation 4 with the microscope optical system 5 being changed over to the macro optical system 7, and FIG. 3 a use state of the optical device for microscopic observation 4 with the microscope optical system 5 being changed over to the micro optical system 8.

The optical device for microscopic observation 4 is provided with a relay lens 9 for re-imaging an image plane where the beam of infrared light from the macro optical system 7 and the micro optical system 8 is focused, a warm stop 10 being a stop member with a light shield property for narrowing down the beam incident from the relay lens 9 side, a support member 11 supporting this warm stop 10 so that it can be inserted to or removed from on the optical axis of the relay lens 9, a vacuum vessel 12 of a nearly cylindrical shape, and a cold stop 13 arranged on the optical axis of the relay lens 9 in the vacuum vessel 12 and being a stop member with a light shield property for narrowing down the beam incident from the relay lens 9 side.

The warm stop 10 has an approximate disk shape, an opening 14 of a nearly circular shape is formed in a center thereof, and a reflective surface 15 is formed on the opposite side to the relay lens 9 located outside the opening 14. This warm stop 10 is fixed to the support member 11 of an elongated shape and is supported so as to be slidable in directions perpendicular to the optical axis of the relay lens 9 by the support member 11. Namely, the warm stop 10 is arranged in such a manner that it can be inserted or removed between a position where it is removed from an exit face 9a of the relay lens 9 (FIG. 2) and a position where it is inserted so as to face the exit face 9a of the relay lens 9 (FIG. 3). When the warm stop 10 is inserted, the warm stop 10 is located at the position corresponding to the pupil position of the micro optical system 8 in the microscope optical system 5 in a state in which the center of the opening 14 thereof is coincident with the optical axis of the relay lens 9. This position corresponding to the pupil position of the micro optical system 8 is preferably near the pupil position and if the pupil position is present in the vacuum vessel 12, it is a position as close to the pupil position as possible and, specifically, a position proximate to a window 12a on the sample S side of the vacuum vessel 12.

The cold stop 13 is arranged inside the vacuum vessel 12 maintained in a low temperature state by an unillustrated cooling device and is configured so that double stop members 13b, 13c are integrally formed inside a tubular member 13a of a cylindrical shape. These stop members 13b, 13c have an approximate disk shape and openings 13d, 13e of a nearly circular shape are formed in their centers so that the centers of the openings 13d, 13e are coincident with the optical axis of the relay lens 9. The window 12a of a circular shape is provided in an end face on the relay lens 9 side of the vacuum vessel 12 and the beam from the sample S having passed through the relay lens 9 travels through the window 12a to enter the cold stop 13 in the vacuum vessel 12. Furthermore, the tip section of the camera 3 is hermetically connected to an opening part 12b of a circular shape on the opposite side to the relay lens 9 in the vacuum vessel 12, whereby an image detection plane of an imaging element built in the camera 3 is arranged so as to face the window 12a with the cold stop 13 in between. This configuration allows the entire cold stop 13 and the tip section of the camera 3 to be maintained in a low temperature state.

Figure 4:
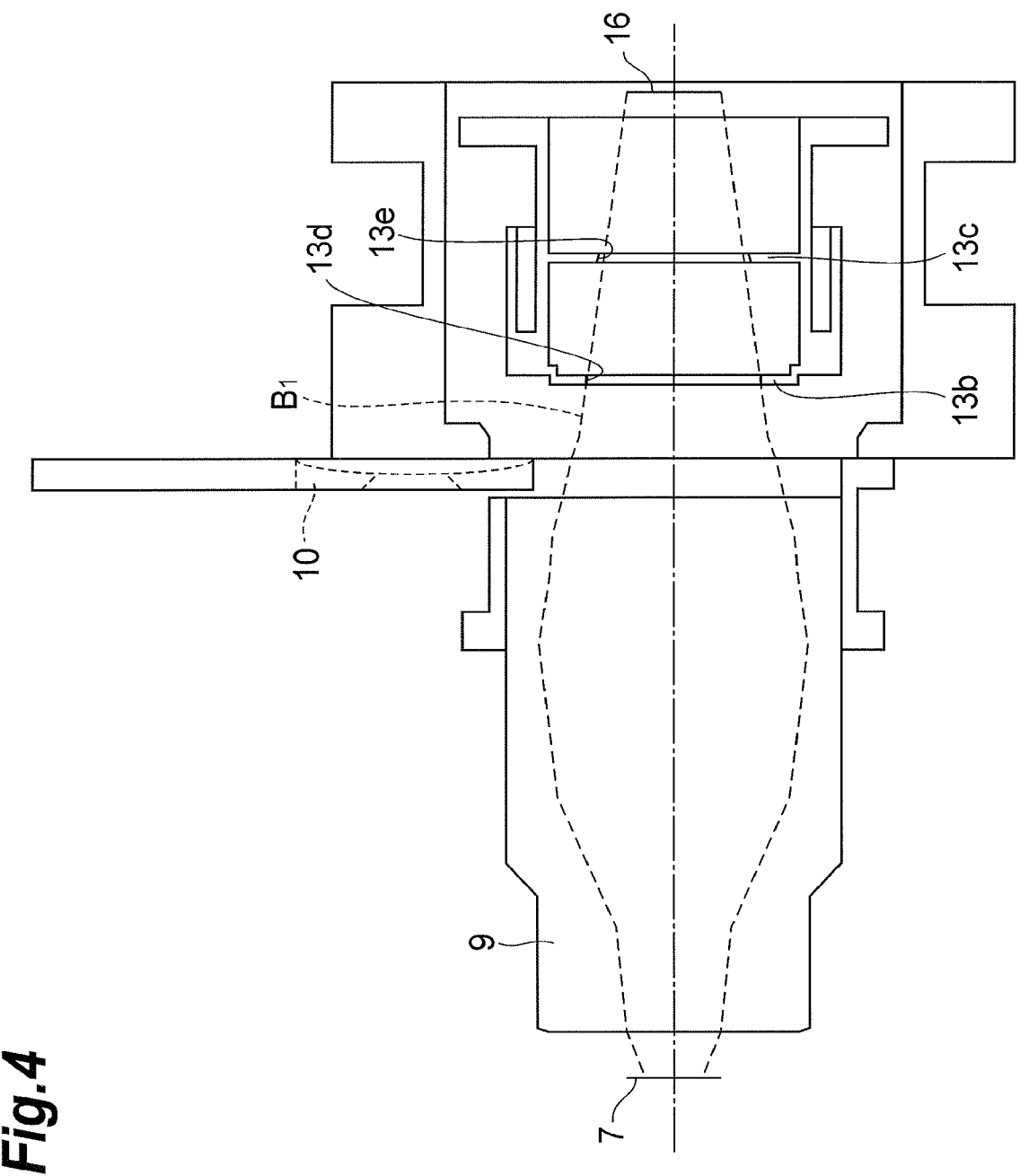
FIG. 4 is a plan view showing a state of incidence of a beam from a sample S in the optical device for microscopic observation 4 wherein a warm stop 10 is removed as shown in FIG. 2.

Next, the relationship between the sizes of the warm stop 10 and the cold stop 13 will be described. FIG. 4 is a plan view showing a state of incidence of the beam from the sample S in the optical device for microscopic observation 4 wherein the warm stop 10 is removed, and FIG. 5 a plan view showing a state of incidence of the beam from the sample S in the optical device for microscopic observation 4 wherein the warm stop 10 is inserted.

With reference to FIG. 4, when the microscope optical system 5 is changed over to the macro optical system 7, it is necessary to use a lens with a large NA for obtaining high sensitivity even with the use of the macro optical system 7 having the relatively low magnification and therefore the exit pupil diameter of the macro optical system 7 becomes larger in accordance therewith. In this case, the beam $B_1$ having been emitted from the sample S and having passed through the macro optical system 7 is re-focused by the relay lens 9 to travel through the openings 13d, 13e of the stop members 13b, 13c of the cold stop 13 to impinge on the imaging element 16 built in the camera 3. In order to prevent the imaging element 16 from observing radiation from the surroundings on this occasion, the inner diameters of the openings 13d, 13e are set to sizes matching the magnification of the macro optical system 7 so as to match the diameter of the beam $B_1$. The "sizes matching the magnification" stated herein refer to sizes ranging from 100% to 120% of the diameter of the beam $B_1$ including an error in a permissible range according to the diameter of the beam $B_1$ determined by the magnification of the macro optical system 7, and do not have to be limited to sizes perfectly coincident with the diameter of the beam $B_1$.

Figure 5:
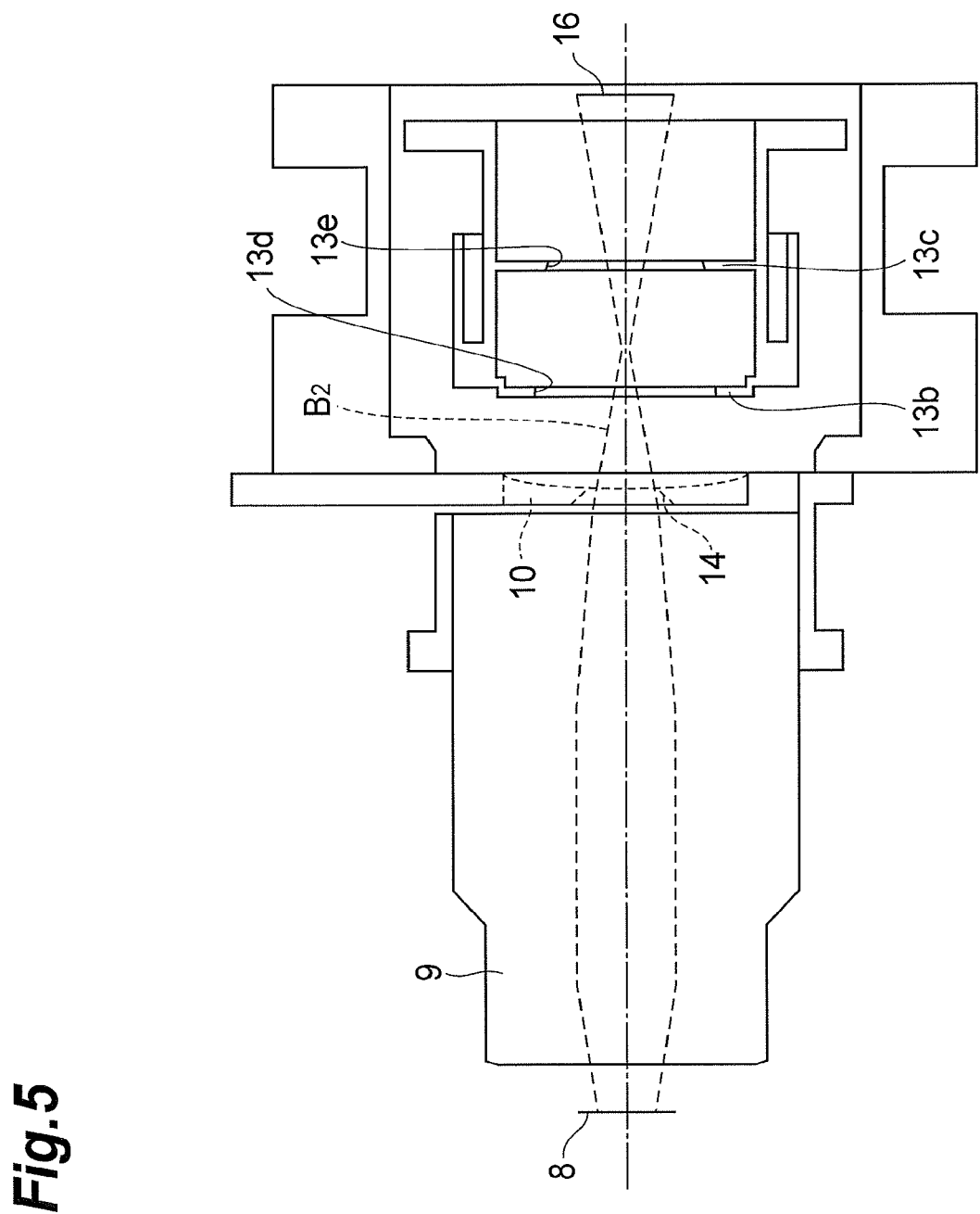
FIG. 5 is a plan view showing a state of incidence of a beam from the sample S in the optical device for microscopic observation 4 wherein the warm stop 10 is inserted as shown in FIG. 3.

With reference to FIG. 5, when the microscope optical system 5 is changed over to the micro optical system 8, the NA needed in the micro optical system 8 with the relatively high magnification is smaller than that in the macro optical system 7 and therefore the exit pupil diameter of the micro optical system 8 becomes smaller according thereto. Specifically, the NA of the micro optical system 8 is that of the macro optical system 7 divided by several tens. In this case, the beam $B_2$ having been emitted from the sample S and having passed through the micro optical system 8 is re-focused by the relay lens 9 to successively travel through the opening 14 of the warm stop 10 and the openings 13d, 13e of the stop members 13b, 13c of the cold stop 13 to impinge on the imaging element 16 built in the camera 3. In order to prevent the imaging element 16 from observing radiation from the surroundings on this occasion, the inner diameter of the opening 14 is set to a size matching the magnification of the micro optical system 8 so as to match the diameter of the beam $B_2$. This results in setting the inner diameter of the opening 14 smaller than the inner diameters of the openings 13d, 13e. The "size matching the magnification" stated herein refers to a size ranging from 100% to 120% of the diameter of the beam $B_2$ including an error in a permissible range according to the diameter of the beam $B_2$ determined by the magnification of the micro optical system 8, and does not have to be limited to a size perfectly coincident with the diameter of the beam $B_2$.

Figure 6:
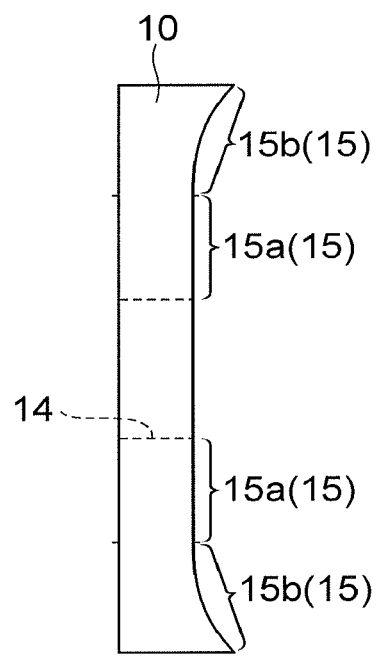
FIG. 6 is a plan view of the warm stop 10 in FIGS. 2 and 3.

Next, the configuration of the warm stop 10 will be described in detail. FIG. 6 shows a plan view of the warm stop 10.

A reflective surface 15 coated with a high-reflectance material such as gold or silver is formed as a surface on the imaging element 16 side of the warm stop 10. This reflective surface 15 is produced so that a reflective face 15a with a gentle slope relative to a face including an opening edge of the opening 14 and a reflective face 15b with a steep slope relative to the face including the opening edge of the opening 14 are continuously formed in this order from the opening edge of the opening 14 toward the outside. Specifically, the reflective face 15a is a plane approximately parallel to the face including the opening edge of the opening 14 and the reflective face 15b a concave face (e.g., a spherical face or the like) whose inclination gradually increases toward the outside. The reflective face 15b may have a conical surface shape whose inclination is constant. The shapes of these reflective faces 15a, 15b are set so as to project an image of the cold stop 13 onto the imaging element 16 and so as not to project an image of the imaging element 16 itself thereto.

Specifically, when the reflective face 15b of the warm stop 10 adopted is a spherical surface shape with the center of a sphere on the optical axis, the radius of curvature R of the reflective face 15b is set different from a distance between the imaging element 16 and the warm stop 10 so that normals to the reflective face 15b are not directed directly to the imaging element 16, in order to prevent luminescence and reflected and scattered light from the imaging element 16 from being again focused on the imaging element 16. Specifically, the radius of curvature R is set to be sufficiently larger than the same distance between the imaging element 16 and the warm stop 10. When a conical surface is adopted as the reflective face 15b of the warm stop 10, intersecting positions of normals to the reflective face 15 with the optical axis are set sufficiently apart from the imaging element so that the normals are not directed directly to the imaging element 16, in order to prevent luminescence and reflected and scattered light from the imaging element 16 from being again focused on the imaging element 16.

Figure 7:
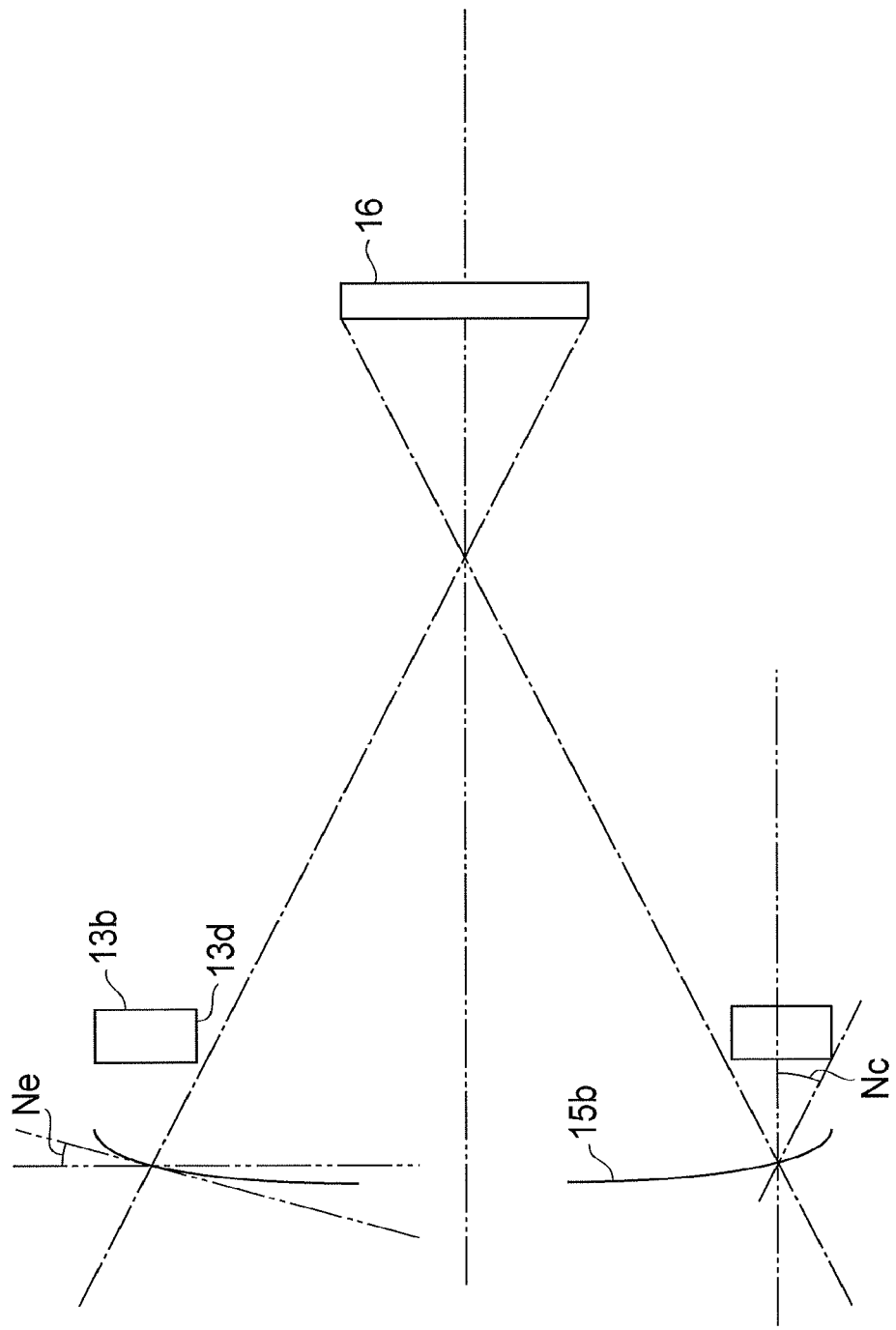
FIG. 7 is a plan view showing an observation range of an imaging element 16 with respect to a reflective face 15b of the warm stop 10 in FIG. 6.

As shown in FIG. 7, the reflective face 15b of the warm stop 10 is formed so that the radius of curvature at a slope of portions corresponding to the diameter of the opening 13d of the stop member 13b of the cold stop 13 or portions intersecting with chain lines in the same drawing is set to not more than about twice the distance between the imaging element 16 and the warm stop 10. This is a condition that lines of sight extending from the imaging element 16 are returned to the interior of the cold stop 13 whereby external radiation is not guided to the imaging element 16. In more detail, when L is the distance between the imaging element 16 and the warm stop 10, $N_m$ NA of the reflective face 15b, $N_e=N_m L/R$ (R is the radius of curvature of the reflective face 15b) an effective inclination in NA equivalent at the edge position of the reflective face 15b, $N_c$ an angle to the periphery of the cold stop 13 in NA equivalent when viewed from the edge position of the reflective face 15b, and $N_d$ an NA of the imaging element 16 when viewed from the reflective face 15b, the condition that the outside of the cold stop 13 is never continually seen from the imaging element 16 is given by Expression (1) below;

$$N_c > N_m + N_d - 2N_e \qquad (1).$$

Therefore, based on the above Expression (1), the radius of curvature R of the reflective face 15b is set so as to satisfy Expression (2) below;

$$R < 2N_m L/(N_m + N_d - N_c) \qquad (2).$$

A angle in NA equivalent is the result of conversion of the angle by a sin function.

Furthermore, the inclination of the portions corresponding to the diameter of the opening 13d of the stop member 13b of the cold stop 13 in the reflective face 15b of the warm stop 10 is set to not more than 45°. This is a condition necessary for preventing radiation from a clearance between the warm stop 10 and the cold stop 13 from impinging on the imaging element 16. When the inclination is set small in this manner, the thickness of the warm stop 10 can be made smaller and an appropriate optical system can be readily formed by the warm stop 10.

Figure 8:
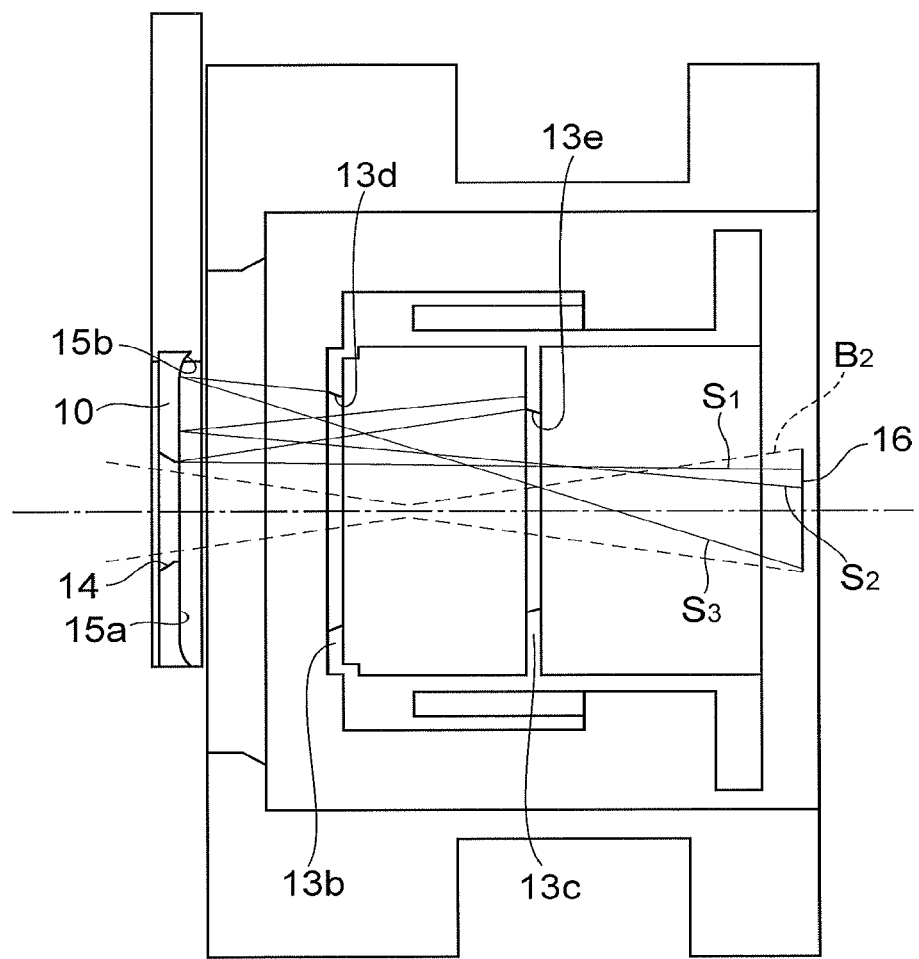
FIG. 8 is a plan view showing an observation range of the imaging element 16 set by the optical device for microscopic observation 4 in FIG. 3.

An observation range of the imaging element 16 set with the warm stop 10 being inserted, in the optical device for microscopic observation 4 of the foregoing configuration will be described with reference to FIG. 8.

As shown in the same drawing, the inside reflective face 15a of the warm stop 10 deflects lines of sight $S_1$, $S_2$ extending from the imaging element 16, to a cooled portion of either stop member 13b or 13c of the cold stop 13. In conjunction therewith, scattered light and reflected light generated by scattering and reflection of the beam $B_2$ by an imaging area of the imaging element 16 is reflected to the outside of the imaging element 16 by the reflective face 15a and is thus prevented from impinging on the imaging element 16. By the outside reflective face 15b of the warm stop 10, a line of sight $S_3$ extending from the imaging element 16 is deflected to a cooled portion of the stop member 13b of the cold stop 13 and thus is prevented from being directed toward a warm part outside the stop member 13b. In conjunction therewith, scattered light and reflected light generated on the imaging area of the imaging element 16 is reflected to the outside of the imaging element 16 by the reflective face 15b and thus is prevented from impinging on the imaging element 16.

In the optical device for microscopic observation 4 described above, when the macro optical system 7 set at the low magnification is used as the microscope optical system 5 on the sample S side, the warm stop 10 is removed from on the optical axis, whereby the light from the sample S is narrowed down by the cold stop 13 having the openings 13d, 13e matching the NA of the macro optical system 7, to impinge on the imaging element 16, which reduces the background noise in the detected image by the imaging element 16. Furthermore, when the micro optical system 8 set at the high magnification is used as the microscope optical system 5 on the sample S side, the warm stop 10 with the opening 14 matching the NA of the micro optical system 8 is set on the optical axis, whereby the light from the sample S is narrowed down according to the beam thereof and then passes through the cold stop 13 to impinge on the imaging element 16. Since the opening 14 of the warm stop 10 is smaller than the openings 13d, 13e of the cold stop 13 herein, the infrared image can be suitably narrowed down corresponding to the microscope optical system 5 with multiple magnifications even if the support member 11 for insertion/removal of the warm stop 10 is located outside the vacuum vessel 12; therefore, the structure of the support member 11 is simplified. Since this support member 11 is provided in the directions intersecting with the optical axis of the microscope optical system 5, downsizing of the support member 11 is also readily implemented. As a result, it is feasible to reduce the background noise with a change-over between observation magnifications of the sample S and to readily realize downsizing of the optical device for microscopic observation 4.

Since the support member 11 is configured so that the opening 14 of the warm stop 10 can be inserted or removed at the position proximate to the window 12a on the sample S side of the vacuum vessel 12, i.e., at the position corresponding to the pupil position of the micro optical system 8, when the high-magnification micro optical system 8 is used, the infrared image of the sample S can be narrowed down in accordance with the diameter thereof.

In the optical device for microscopic observation 4, the reflective surface 15 provided in the warm stop 10 causes the imaging element 16 to observe the light from the cold stop 13 but not to observe the light reflected by the imaging element 16. This allows both of spot noise and background noise to be reduced in the detected image by the imaging element 16, in use of the microscope optical system 5 on the sample S side while being changed over.

In the conventional microscope apparatus, for using both of a high-magnification objective lens and a low-magnification objective lens, it is first necessary to make the camera-side NA sufficiently large, for effective use of the low-magnification lens. Specifically, when the magnification of the low-magnification lens for the camera is represented by a and the NA thereof is n, the camera-side NA needs to be set to n/a. However, since the NA necessary for the high-magnification lens is that for the low-magnification lens divided by several tens, the cold stop for adjustment of the camera NA needed to suit the NA of the low-magnification lens, for effective use of the two lenses. For this reason, the conventional microscope apparatus observed the radiation from the surroundings through the excess NA portion in use of the high-magnification lens, so as to result in increase of background noise. In order to solve the problem of background noise, it is effective to change the size of the cold stop according to the objective lens. However, since the cold stop is usually arranged in vacuum and cooled at ultralow temperature, it is difficult to provide a mechanism for change of size. In contrast to it, the present embodiment involves the insertion/removal of the warm stop 10 outside the vacuum vessel 12 in accordance with the magnification of the microscope optical system 5 on the sample S side, thereby achieving the same effect as decrease of the size of the cold stop. Since the position of the warm stop 10 is not limited by the position of the exit pupil, there is no need for design of dedicated objective lenses, which facilitates optical design of the entire device.

The infrared optical device described in the prior Literature (Japanese Patent Application Laid-Open Publication No. H06-160696) allows suitable observation with interchangeable lenses of various image-side numerical apertures by moving the mirror apertures along the optical axis of the interchangeable lens upon a changeover of the object-side interchangeable lens, but it requires the mechanism for fine adjustment of the positions of the mirror apertures, which tends to increase the scale of the device. If there is a large difference between the numerical apertures of interchangeable lenses as interchanged objects, it is necessary to ensure a large adjustable distance for the mirror apertures, which tends to increase the scale of the device. In contrast to it, since the optical device for microscopic observation 4 of the present embodiment is provided with the support member 11 for insertion/removal of the warm stop 10 in the directions intersecting with the optical axis of the microscope optical system 5, there is no need for the mechanism for fine adjustment nor for ensuring the distance in the optic-axis direction, which facilitates downsizing of the device.

Since the reflective face 15a and the reflective face 15b are continuously formed from the opening 14 side toward the outside in the reflective surface 15 of the warm stop 10, it is feasible to set the device so as to prevent the imaging element 16 from observing radiant heat from the part other than the cold stop 13 and to make the reflected light by the imaging element 16 itself unlikely to be observed.

Since the radius of curvature of the reflective face 15b of the warm stop 10 is set to not more than twice the distance between the imaging element 16 and the warm stop 10, it is feasible to make radiation from the high-temperature part outside the cold stop 13 unlikely to impinge on the imaging element 16.

Furthermore, since the opening 14 of the warm stop 10 is smaller than the openings 13d, 13e of the cold stop 13, even if the microscope optical system 5 on the sample S side is used as changed over, the background noise in the detected image can be reduced corresponding to the NA of the microscope optical system 5.

Second Embodiment

Figure 9:
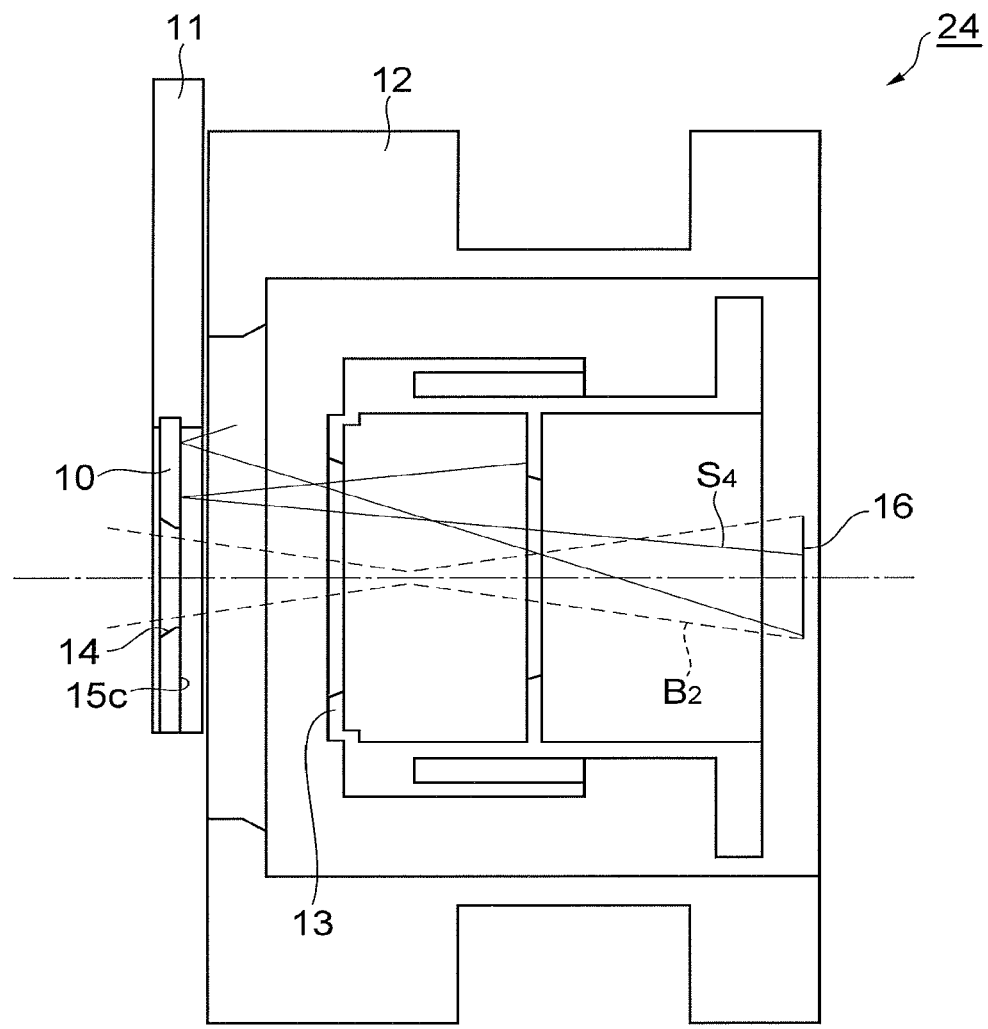
FIG. 9 is a plan view showing the major part of an optical device for microscopic observation 24 according to the second embodiment of the present invention.

FIG. 9 is a plan view showing the major part of an optical device for microscopic observation 24 according to the second embodiment of the present invention. The optical device for microscopic observation 24 of the present embodiment is different in the shape of the reflective surface 15 of the warm stop 10 from the optical device for microscopic observation 4 according to the first embodiment.

Specifically, the warm stop 10 of the optical device for microscopic observation 24 has a reflective face 15c of a planar shape formed along the face including the opening edge of the opening 14, from the opening edge of the opening 15 toward the outside. The reflective face 15c of this shape deflects a line of sight $S_4$ extending from the imaging element 16, to a cooled part of either stop member 13b or 13c of the cold stop 13. In conjunction therewith, scattered light and reflected light generated by scattering and reflection of the beam $B_2$ on the imaging area of the imaging element 16 is reflected by the reflective face 15c to the outside of the imaging element 16, so as not to impinge on the imaging element 16.

Third Embodiment

Figure 10:
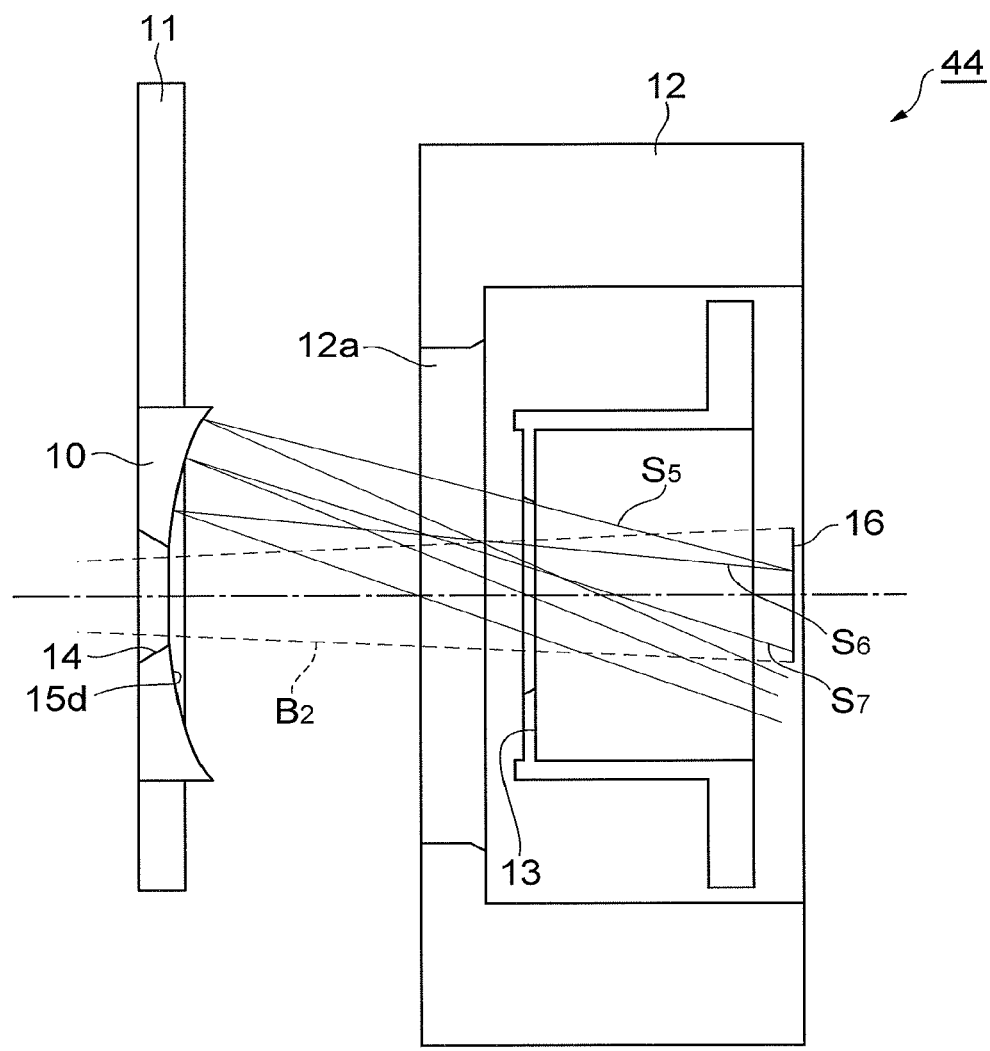
FIG. 10 is a plan view showing the major part of an optical device for microscopic observation 44 according to the third embodiment of the present invention.

FIG. 10 is a plan view showing the major part of an optical device for microscopic observation 44 according to the third embodiment of the present invention. The optical device for microscopic observation 44 of the present embodiment is different from the optical device for microscopic observation 4 according to the first embodiment, in the shape of the reflective surface 15 of the warm stop 10 and in that the warm stop 10 and the support member 11 supporting it are separated from the vacuum vessel 12 housing the cold stop 13.

Namely, the warm stop 10 is supported by the support member 11 so that it can be inserted to or removed from on the optical axis of the relay lens 9 at a position apart from the window 12a of the vacuum vessel 12. An optical system such as a mirror may be placed between the warm stop 10 and the window 12a and this optical system may be arranged to change the direction of the beam B2 passing through the warm stop 10, while the imaging element 16 and the cold stop 13 are arranged off the optical axis of the relay lens 9. This can avoid increase in the scale of the optical device for microscopic observation 44.

The warm stop 10 of the optical device for microscopic observation 24 has a reflective face 15d of a concave shape whose inclination relative to the face including the opening edge of the opening 14, gradually increases from the opening edge of the opening 14 to the outside. By adopting the reflective face 15d of the concave shape, it becomes feasible to readily set the shape to reflect the light from the cold stop 13 to the imaging element 16. The reflective face 15d of this shape deflects lines of sight $S_5$, $S_6$, and $S_7$ extending from the imaging element 16, toward the cooled part inside the cold stop 13. In conjunction therewith, scattered light and reflected light generated by scattering and reflection of the beam $B_2$ is reflected to the outside of the imaging element 16 by the reflective face 15d, so as not to impinge on the imaging element 16.

Fourth Embodiment

Figure 11:
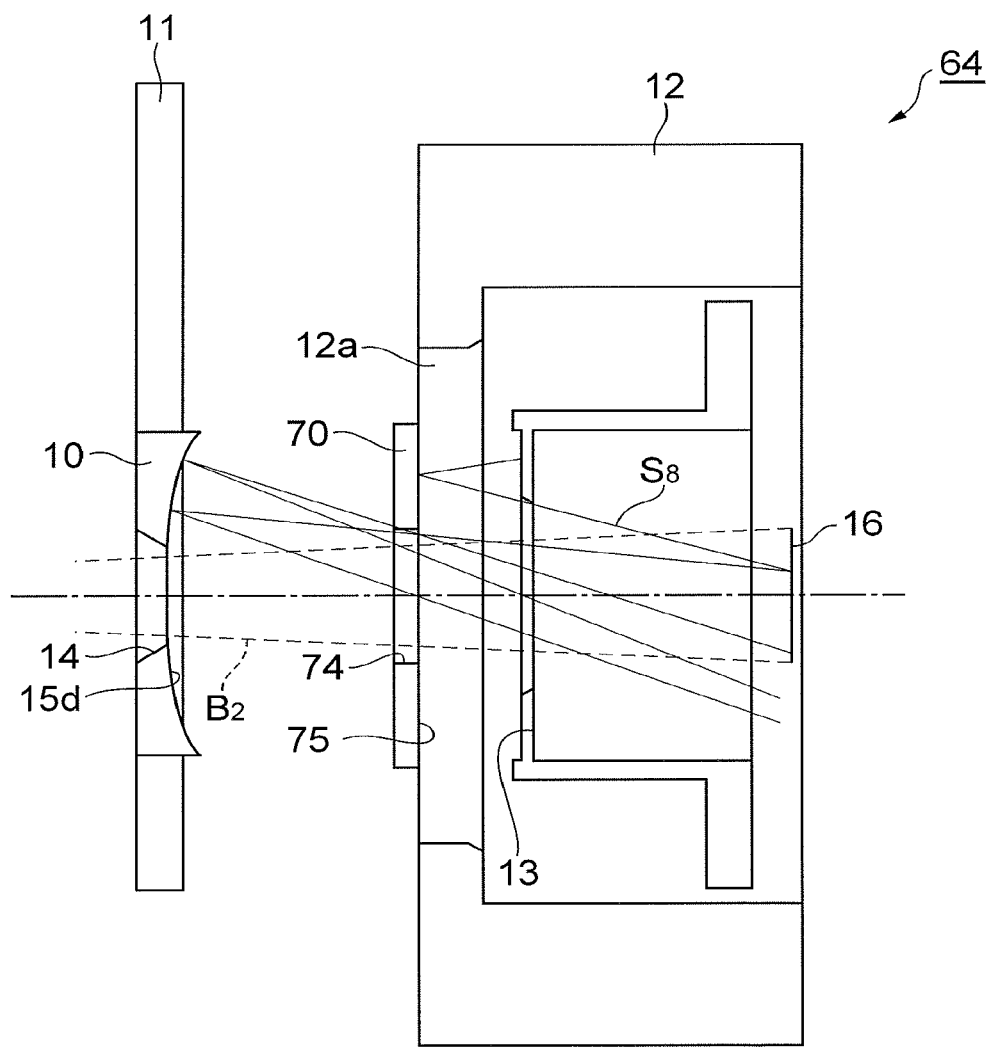
FIG. 11 is a plan view showing the major part of an optical device for microscopic observation 64 according to the fourth embodiment of the present invention.

FIG. 11 is a plan view showing the major part of an optical device for microscopic observation 64 according to the fourth embodiment of the present invention. The optical device for microscopic observation 64 of the present embodiment is different from the optical device for microscopic observation 44 according to the third embodiment, in that an auxiliary warm stop 70 is provided near the outside of the window 12a of the vacuum vessel 12 between the warm stop 10 and the cold stop 13.

This auxiliary warm stop 70 is a light shield member having an approximate disk-like shape and is arranged along the window 12a of the vacuum vessel 12 so that its central axis coincides with the optical axis of the relay lens 9. A circular opening 74 having a diameter sufficiently larger than the diameter of the beam B2 and facing the opening of the cold stop 13 is formed in a central region of the auxiliary warm stop 70. Furthermore, a reflective face 75 of a planar shape is formed as an outside face of the opening 74 on the window 12a side of the auxiliary warm stop 70.

As equipped with such auxiliary warm stop 70, a line of sight $S_8$ extending from the imaging element 16 to the outside of the warm stop 10 is deflected to the cooled part of the cold stop 13 by the reflective face 75 of the auxiliary warm stop 70. In conjunction therewith, scattered light and reflected light directed from the imaging area of the imaging element 16 to the outside of the warm stop 10 is reflected to the outside of the cold stop 13 by the reflective face 75, so as not to impinge on the imaging element 16.

The optical device for microscopic observation 64 of this configuration can prevent the reflected light and scattered light from the imaging element 16 from again impinging on the imaging element 16 and can make the light from the high-temperature part unlikely to impinge on the imaging element 16 even with decrease in the diameter of the warm stop 10. As a result, the device can be downsized and optical design becomes easier.

The present invention is by no means intended to be limited to the foregoing embodiments. For example, the number of warm stops is not limited to a specific number, but may be increased or decreased according to the number of objective lenses used as changed over from one to another on the sample S side. The reflective face 75 formed on the face outside the opening 74 on the window 12a side of the auxiliary stop 70 does not have to be limited to the planar shape, but it may be a concave shape such as a spherical surface, or a conical surface shape.

Figure 12:
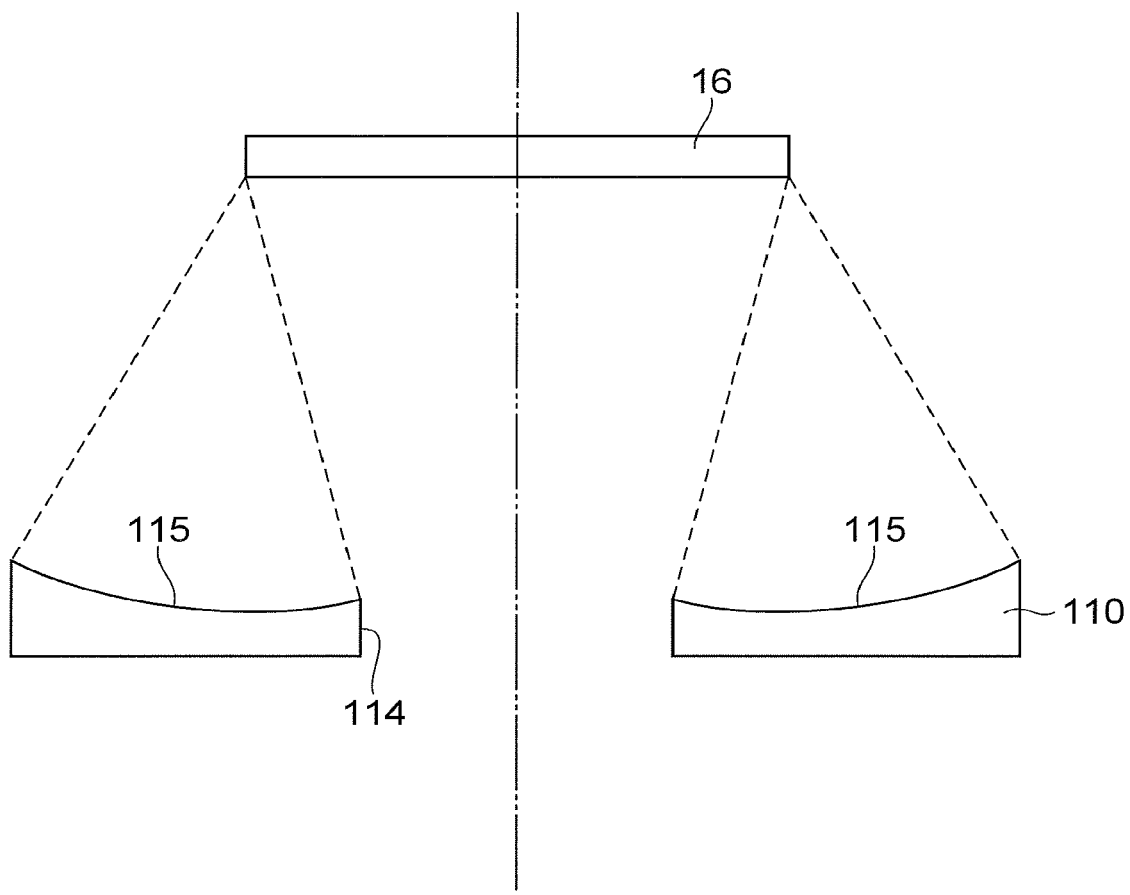
FIG. 12 is a plan view of a warm stop 110 being a modification example of the present invention.

The shape of the reflective face of the warm stop may be a shape as shown in FIG. 12. A warm stop 110 being a modification example of the present invention shown in the same drawing has a reflective face 115 having an arc cross section along the optical axis of the relay lens 9 and being rotationally symmetric with respect to the optical axis of the relay lens 9, which is formed from an opening edge of an opening 114 to the outside and on the imaging element 16 side. This reflective face 115 has such a shape that the center of the arc formed by the reflective face 115 is located at the edge on the detection plane of the imaging element 16 and that normals to the reflective face 115 extend to the edge of the imaging element 16 located in the same direction among directions perpendicular to the optical axis, without intersecting with the optical axis. However, this reflective face 115 is not always limited to the shape in which the center of the arc is located at the edge of the imaging element 16, but it may be a shape in which it is located nearer the central region from the edge of the imaging element 16. The warm stop 110 having this reflective face 115 also implements such setting as to project an image of the cold stop 13 onto the imaging element 16 and not to project an image of the imaging element 16 itself thereto. Specifically, it can prevent a part of a signal or noise incident through the opening 114 of the warm stop 110 from being specularly reflected on the surface of the imaging element 16, further being reflected on the warm stop 110, and thereafter returning to the imaging element 16. In addition, when the normals at respective points on the reflective face 115 are directed to the inside as much as possible, it can project an image of the cold part, i.e., the cold stop 13 onto the imaging element 16.

Figure 13:
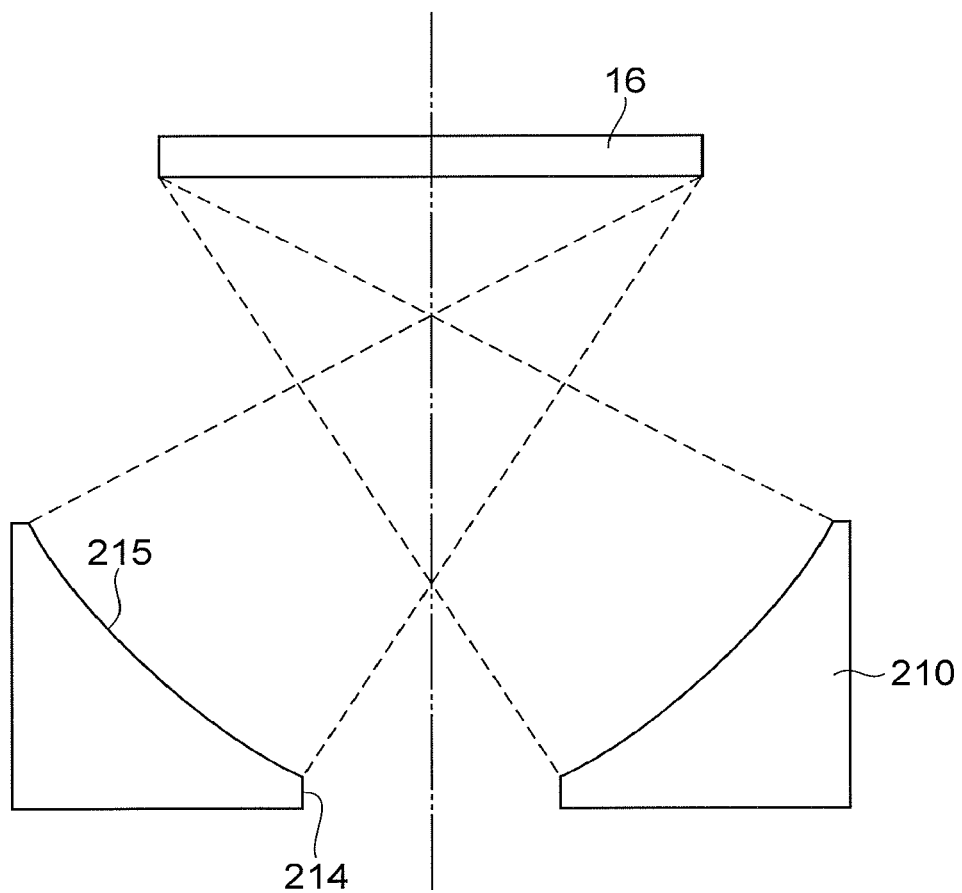
FIG. 13 is a plan view of a warm stop 210 being another modification example of the present invention.

The shape of the reflective face of the warm stop may also be a shape as shown in FIG. 13. A warm stop 210 being a modification example of the present invention shown in the same drawing has a reflective face 215 having an arc cross section along the optical axis of the relay lens 9 and being rotationally symmetric with respect to the optical axis of the relay lens 9, which is formed from an opening edge of an opening 214 to the outside and on the imaging element 16 side. This reflective face 215 has such a shape that the center of the arc formed by the reflective face 215 is located at the edge on the opposite side on the detection plane of the imaging element 16 and that normals to the reflective face 215 extend to the edge of the imaging element 16 located in the opposite direction among directions perpendicular to the optical axis, while intersecting with the optical axis. However, this reflective face 215 is not always limited to the shape in which the center of the arc is located at the edge of the imaging element 16, but it may be a shape in which it is located nearer the central region from the edge of the imaging element 16. The warm stop 210 having this reflective face 215 also implements such setting as to project an image of the cold stop 13 onto the imaging element 16 and not to project an image of the imaging element 16 itself thereto as the warm stop 110 does.

Figure 14:
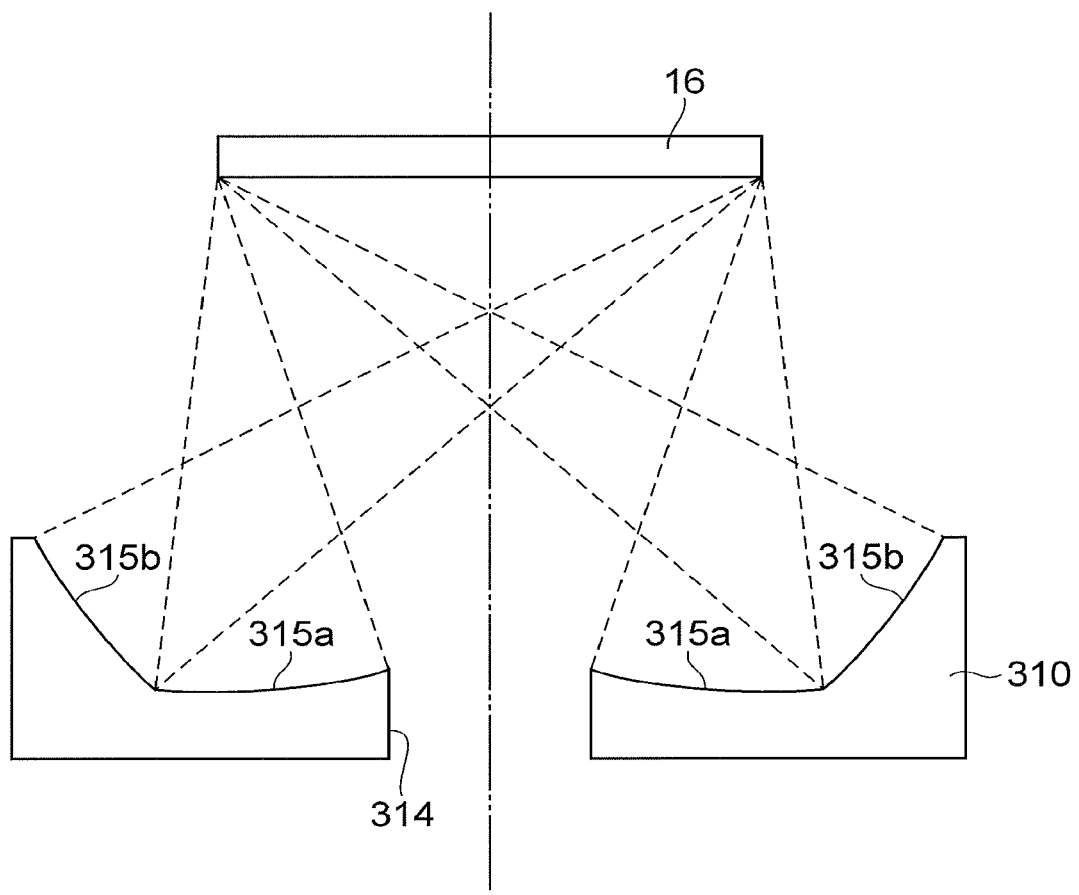
FIG. 14 is a plan view of a warm stop 310 being another modification example of the present invention.

The shape of the reflective face of the warm stop may also be a shape such as a combination of the shapes of the reflective face 115 and the reflective face 215, as shown in FIG. 14. The warm stop 310 being a modification example of the present invention shown in the same drawing has two reflective faces 315a, 315b formed from an opening edge of an opening 314 to the outside and in the named order on the imaging element 16 side. This reflective face 315a has the same cross-sectional shape as the reflective face 115 and such a shape that the center of the arc formed by the reflective face 315a is located at the edge on the detection plane of the imaging element 16. The reflective face 315b has the same cross-sectional shape as the reflective face 215 and such a shape that the center of the arc formed by the reflective face 315b is located at the edge on the opposite side on the detection plane of the imaging element 16. The warm stop 310 having this reflective face 315 also implements such setting as to project an image of the cold stop 13 onto the imaging element 16 and not to project an image of the imaging element 16 itself thereto as the warm stops 110, 210 do.

Figure 15:
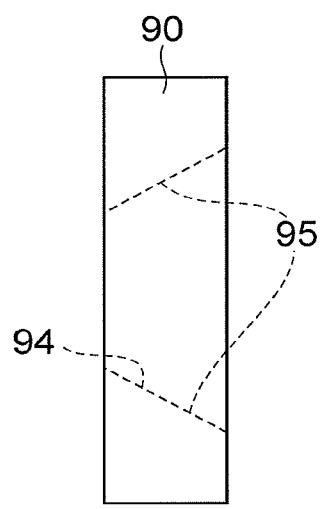
FIG. 15 is a plan view of a warm stop 90 being another modification example of the present invention.

The shape of the reflective face of the warm stop may also be a shape as shown in FIG. 15. The warm stop 90 being a modification example of the present invention shown in the same figure has an opening 94 formed with an inner wall diverging toward the imaging element 16, and a reflective face 95 is formed on the inner wall of this opening 94. This reflective face 95 has a conical surface shape whose inclination relative to a face including an opening edge of the opening 94 is constant, and this inclination and the thickness of the warm stop 90 (the length of the opening 94) are set so as to project an image of the cold stop 13 onto the imaging element 16 and not to project an image of the imaging element 16 itself thereto.

The microscope device 1 may be equipped with a driving mechanism for driving the support member 11 of the optical device for microscopic observation 4, 22, 44, or 64, and a control circuit for controlling the driving mechanism, and the control circuit may control the driving mechanism so as to automatically insert or remove the warm stop 10, based on data of objective lenses registered in advance.

The microscope device 1 can be applied to targets of various objects that emit light of specific wavelength such as infrared light, e.g., semiconductors, inorganic and organic substances to emit fluorescence or phosphorescence, etc., as the sample S of observation target.

A preferred configuration herein is such that the second magnification is higher than the first magnification. In this case, the observation magnification of the object can be changed over between the low magnification and the high magnification.

Another preferred configuration is such that the support member is configured so that the second opening of the warm stop can be inserted or removed at the position proximate to the object-side window of the vacuum vessel. When the device is equipped with such a support member, the diameter can be narrowed down in accordance with the image-side numerical aperture in use of the optical system with the second magnification.

Furthermore, another preferred configuration is such that the support member is configured so that the second opening of the warm stop can be inserted or removed at the position corresponding to the pupil position of the optical system with the second magnification. When the device is equipped with such a support member, the diameter can be narrowed down in accordance with the image-side numerical aperture in use of the optical system with the second magnification.

Moreover, another preferred configuration is such that the reflective surface of the warm stop is formed so as to project an image of the cold stop onto the imaging element and so as not to project an image of the imaging element itself thereto. By this configuration, the reflective surface provided in the warm stop causes the imaging element to observe the light from the cold stop but not to observe the light reflected from the imaging element. This can reduce both of spot noise and background noise in the detected image by the imaging element when the object-side optical system is used as changed over from one to another.

Furthermore, another preferred configuration is such that the reflective surface of the warm stop comprises the first face with the gentle slope relative to the face including the opening and the second face with the steep slope relative to the same face continuously formed from the opening side to the outside. When this configuration is adopted, the second face allows such setting that the imaging element does not observe light from the part other than the cold stop and the first face makes the reflected light by the imaging element itself unlikely to be observed.

Still another preferred configuration is such that the reflective surface is formed in a concave shape at least in part. In this case, it is feasible to readily set the shape to reflect the light from the cold stop to the imaging element.

Furthermore, another preferred configuration is such that the device further comprises the auxiliary warm stop provided outside the vacuum vessel between the warm stop and the cold stop and being the stop member having the opening facing the opening of the warm stop and having the reflective surface formed on the imaging element side. This configuration can prevent the reflected light from the imaging element from impinging again on the imaging element and can make the light from the high-temperature part less likely to impinge on the imaging element even with decrease in the diameter of the warm stop.

Moreover, still another preferred configuration is such that the radius of curvature of the reflective surface of the warm stop is not more than twice the distance between the imaging element and the warm stop. When this configuration is adopted, the light from the high-temperature part outside the cold stop can be made less likely to impinge on the imaging element.

Furthermore, another preferred configuration is such that the reflective surface of the warm stop or the auxiliary warm stop is formed in a planar shape at least in part. In this case, the simple shape can prevent the light reflected by the imaging element itself, from impinging on the imaging element.

Another preferred configuration is such that the reflective surface of the warm stop or the auxiliary warm stop is formed in a conical surface shape at least in part. In this case as well, the simple shape can prevent the light reflected by the imaging element itself, from impinging on the imaging element.

INDUSTRIAL APPLICABILITY

The present invention has use application to the optical devices for microscopic observation provided for enlarged observation of light from an object and enables reduction of background noise with use of optical systems of multiple observation magnifications and easy implementation of downsizing of the device.

REFERENCE SIGNS LIST

3 camera (imaging element); 4, 22, 44, 64 optical device for microscopic observation; 5 microscope optical system; 7 macro optical system; 8 micro optical system; 10, 90, 110, 210, 310 warm stop; 11 support member; 13 cold stop; 13*d*, 13*e* opening; 14, 114, 214, 314 opening; 15, 15*a*, 15*b*, 15*c*, 15*d*, 115, 215, 315*a*, 315*b* reflective surface or face; 16 imaging element; 70 auxiliary warm stop; 74 opening; 75 reflective surface.

The invention claimed is:

1. A microscope system for imaging an image of an object, comprising:
    a detector arranged in a vessel and configured to detect light from the object;
    a microscope optical system comprising:
        a first optical system having a lens of a first magnification; and
        a second optical system having a lens of a second magnification which is higher than the first magnification;
    a second aperture having a size that matches the second optical system and being disposed independently from the microscope optical system outside the vessel; and
    the vessel having a first aperture on an optical path,
    wherein one of the first optical system or the second optical system is disposed to face the object, the second aperture is removed from the optical path between the microscope optical system and the detector when the first optical system is disposed to face to the object, and the second aperture is inserted onto the optical path when the second optical system is disposed to face to the object,
    wherein the second aperture is configured so that the second aperture can be inserted or removed at a position proximate to a window on a side facing the object of the vessel, and
    wherein a shape at the second aperture becomes thinner toward a tip.

2. The microscope system according to claim 1, further comprising a support member including the second aperture.

3. The microscope system according to claim 2, wherein the support member includes a plurality of apertures.

4. The microscope system according to claim 1, further comprising a driving mechanism for driving the second aperture and a control circuit for controlling the driving mechanism.

5. The microscope system according to claim 1, wherein the second aperture is configured to be inserted or removed at a position corresponding to a pupil position of the second optical system.

6. The microscope system according to claim 1, further comprising a third aperture disposed outside the vessel.

7. The microscope system according to claim 1, wherein the detector is a camera configured to detect infrared light emitted from a sample.

8. The microscope system according to claim 1, wherein the object is a semiconductor device.

9. A microscopic observation method for imaging an image of an object using a microscope system comprising a microscope optical system comprising a first optical system having a lens of a first magnification and a second optical system having a lens of a second magnification which is higher than the first magnification, a second aperture having a size matching the second optical system and being disposed independently from the microscope optical system outside a vessel corresponding to the second optical system, a detector arranged in the vessel, the vessel having a first aperture on an optical path between the microscope optical system and the detector, the second aperture being configured so that the second aperture can be inserted or removed at a position proximate to a window on a side facing the object of the vessel, and a shape at the second aperture becoming thinner toward a tip, the method comprising:

locating the first optical system to face to the object and removing the second aperture from an optical path of a light from the object between the microscope optical system and the detector;

by the detector, imaging the light passing through the first optical system;

locating the second optical system to face to the object and inserting the second aperture onto the optical path; and by the detector, imaging the light passing through the second optical system and the second aperture.

10. The microscopic observation method according to claim 9, wherein the second aperture is inserted or removed at a position corresponding to a pupil position of the second optical system.

11. The microscopic observation method according to claim 9, wherein the detector is a camera configured to detect infrared light emitted from a sample.

12. The microscopic observation method according to claim 9, wherein the object is a semiconductor device.

* * * * *